(12) United States Patent
Akiyama (10) Patent No.: US 10,583,991 B2
(45) Date of Patent: Mar. 10, 2020

(54) SLIDE RAIL ASSEMBLIES FOR MOVING OBJECTS ON A TRANSFER PATH, CONVEYOR ASSEMBLIES HAVING SLIDE RAIL ASSEMBLIES, AND METHODS OF MOVING OBJECTS ON A TRANSFER PATH

(71) Applicant: Toyota Motor Engineering & Manufacturing North America, Inc., Erlanger, KY (US)

(72) Inventor: Shigeo Akiyama, Lexington, KY (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 15/899,928

(22) Filed: Feb. 20, 2018

(65) Prior Publication Data
US 2019/0256296 A1 Aug. 22, 2019

(51) Int. Cl.
*B65G 35/00* (2006.01)
*B65G 47/74* (2006.01)
*B65G 65/00* (2006.01)
*B65G 47/82* (2006.01)
*B65G 25/10* (2006.01)

(52) U.S. Cl.
CPC ............. *B65G 35/00* (2013.01); *B65G 25/10* (2013.01); *B65G 47/74* (2013.01); *B65G 47/82* (2013.01); *B65G 65/00* (2013.01); *B65G 2201/0267* (2013.01)

(58) Field of Classification Search
CPC ........ B65G 25/08; B65G 25/10; B65G 25/12; B65G 47/82; B65G 19/26; B65G 19/265; B65G 35/00; B65G 47/74; B65G 65/00; B65G 2201/0267

USPC ......................... 198/738, 741–743, 745, 747
See application file for complete search history.

(56) References Cited

U.S. PATENT DOCUMENTS

| | | | | |
|---|---|---|---|---|
| 724,831 A | * | 4/1923 | Evans ................... | B65G 25/10 198/747 |
| 1,560,373 A | * | 11/1925 | Birnstock ................ | B08B 9/42 198/745 |
| 3,382,968 A | * | 5/1968 | Klein, Jr. ............... | B65G 47/31 192/113.1 |

(Continued)

FOREIGN PATENT DOCUMENTS

| DE | 202006015904 U1 | 12/2006 |
|---|---|---|
| KR | 20100127621 A | 12/2010 |

(Continued)

*Primary Examiner* — Mark A Deuble
(74) *Attorney, Agent, or Firm* — Dinsmore & Shohl LLP (57) ABSTRACT

A slide rail assembly for moving an object on a transfer path, includes a rail, a slide arm, and a finger. The rail extends in a transfer direction of the transfer path. The slide arm is slidably connected to the rail. The slide arm is moveable in the transfer direction between a retracted position and an extended position. The finger is connected to the slide arm. The finger is moveable between an engaged position and a disengaged position upon movement of the slide arm between the retracted position and the extended position. In the engaged position the finger is engaged with the object such that upon movement of the slide arm from the retracted position towards the extended position the object is moved in the transfer direction along the transfer path.

18 Claims, 9 Drawing Sheets

(56) References Cited

U.S. PATENT DOCUMENTS

| | | | | |
|---|---|---|---|---|
| 3,512,629 | A | * | 5/1970 | Torrance ................ B65G 47/00 198/718 |
| 4,018,328 | A | * | 4/1977 | Galarowic ............. B65G 25/10 198/741 |
| 4,270,880 | A | | 6/1981 | Allard |
| 4,282,969 | A | * | 8/1981 | Zipser .................... A01D 90/08 198/747 |
| 4,342,387 | A | * | 8/1982 | Gray ....................... B60S 3/004 198/746 |
| 4,600,099 | A | * | 7/1986 | Peddinghaus .......... B23Q 7/001 198/468.6 |
| 5,320,212 | A | * | 6/1994 | McIntosh ............... B65G 25/10 198/468.11 |
| 8,196,734 | B2 | * | 6/2012 | Chen .................... B23K 1/0016 198/429 |
| 8,757,362 | B2 | * | 6/2014 | Ono ....................... B65G 25/10 198/465.1 |
| 10,233,027 | B1 | * | 3/2019 | McCafferty ............ B65G 25/10 |

FOREIGN PATENT DOCUMENTS

| | | |
|---|---|---|
| KR | 101489271 B1 | 2/2015 |
| KR | 20170064590 A | 6/2017 |
| WO | 2013156159 A1 | 10/2013 |

\* cited by examiner

SLIDE RAIL ASSEMBLIES FOR MOVING OBJECTS ON A TRANSFER PATH, CONVEYOR ASSEMBLIES HAVING SLIDE RAIL ASSEMBLIES, AND METHODS OF MOVING OBJECTS ON A TRANSFER PATH

TECHNICAL FIELD

The present specification generally relates to slide rail assemblies, conveyor assemblies, and methods, and more particularly, slide rail assemblies, conveyor assemblies and methods utilizing a sliding arm for moving objects on a transfer path.

BACKGROUND

It has been known to provide transfer paths to move objects, such as pallets, from a loading station towards an unloading station. The previously known transfer paths typically include gravity fed roller conveyors that are tilted downwardly from the loading station towards the unloading station. The previously known roller conveyors rely on gravity to index or move the pallets on the roller conveyor from the loading station towards the unloading station. Specifically, gravity forces act on the pallets to roll the pallets on the downward tilt of the roller conveyors. However, the movement of the traditional gravity fed roller conveyors is uncontrolled and could result in the inconsistent or unintended movement of pallets.

It has also been known to utilize powered conveyors in which a motor rotates an endless belt to transfer the pallets from the loading station towards the unloading station. In the previously known powered conveyors, an operator is required to actuate the motor to start and stop the conveyor in order to index the pallet. However, the previously known powered conveyors are costly and required an increase in lead time as the operator must start and stop the motor which can lead to inconsistent indexing of the pallets.

Accordingly, there exists a need for alternative assemblies and methods for indexing an object on a transfer path that provides consistent indexing without an increase in lead time of moving the objects.

SUMMARY

In one embodiment, a slide rail assembly for moving an object on a transfer path, includes a rail, a slide arm, and a finger. The rail extends parallel to a transfer direction of the transfer path. The slide arm is slidably connected to the rail. The slide arm is moveable in the transfer direction between a retracted position and an extended position. The finger is connected to the slide arm. The finger is moveable between an engaged position and a disengaged position upon movement of the slide arm between the retracted position and the extended position. In the engaged position the finger is engaged with the object such that upon movement of the slide arm from the retracted position towards the extended position the object is moved in the transfer direction along the transfer path. In the disengaged position the finger is disengaged with the object such that upon movement of the slide arm from the extended position towards the retracted position the slide arm moves independent from the object.

In another embodiment, a conveyor assembly for moving an object includes a transfer path, a rail, a slide arm, and finger. The transfer path extends in a transfer direction. The rail extends adjacent the transfer path and parallel to the transfer direction. The slide arm that is slidably connected to the rail. The slide arm is moveable in the transfer direction between a retracted position and an extended position. The finger is connected to the slide arm. The finger is moveable between an engaged position and a disengaged position upon movement of the slide arm between the retracted position and the extended position. In the engaged position the finger is engaged with the object such that upon movement of the slide arm from the retracted position towards the extended position the object is moved in the transfer direction along the transfer path. In the disengaged position the finger is disengaged with the object such that upon movement of the slide arm from the extended position towards the retracted position the slide arm moves independent from the object.

In another embodiment, a method for moving an object along a transfer path includes providing a slide arm that is slidably connected to a rail that extends adjacent the transfer path and parallel to a transfer direction of the transfer path. The slide arm includes a finger pivotally connected to the slide arm. The finger is moveable between an engaged position and a disengaged position. The method further includes sliding the slide arm from the retracted position towards the extended position to move the finger into the engaged position to engage the object such that movement of the slide arm towards the extended position the object is moved in the transfer direction along the transfer path. The method further includes sliding the slide arm from the extended position towards the retracted position to move the finger from the engaged position to the disengaged position such that the slide arm moves independent from the object.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Slide rail assemblies, conveyor assemblies, and methods for moving an object along a transfer path are disclosed herein. In one embodiment, a slide rail assembly for moving an object on a transfer path, includes a rail, a slide arm, and a finger. The rail extends in a transfer direction of the transfer path. The slide arm is slidably connected to the rail. The slide arm is moveable in the transfer direction between a retracted position and an extended position. The finger is connected to the slide arm. The finger is moveable between an engaged position and a disengaged position upon movement of the slide arm between the retracted position and the extended position. In the engaged position the finger is engaged with the object such that upon movement of the slide arm from the retracted position towards the extended position the object is moved in the transfer direction along the transfer path. In the disengaged position the finger is disengaged with the object such that upon movement of the slide arm from the extended position towards the retracted position the slide arm moves independent from the object.

In another embodiment, a conveyor assembly for moving an object includes a roller conveyor, a rail, a slide arm, and finger. The roller conveyor extends in a transfer direction. The rail extends adjacent the roller conveyor and parallel to the transfer direction. The slide arm that is slidably connected to the rail. The slide arm is moveable in the transfer direction between a retracted position and an extended position. The finger is connected to the slide arm. The finger is moveable between an engaged position and a disengaged position upon movement of the slide arm between the retracted position and the extended position. In the engaged position the finger is engaged with the object such that upon movement of the slide arm from the retracted position towards the extended position the object is moved in the transfer direction along the roller conveyor. In the disengaged position the finger is disengaged with the object such that upon movement of the slide arm from the extended position towards the retracted position the slide arm moves independent from the object.

In another embodiment, a method for moving an object along a roller conveyor includes providing a slide arm that is slidably connected to a rail that extends adjacent the roller conveyor and parallel to a transfer direction of the roller conveyor. The slide arm includes a finger pivotally connected to the slide arm. The finger is moveable between an engaged position and a disengaged position. The method further includes sliding the slide arm from the retracted position towards the extended position to move the finger into the engaged position to engage the object such that movement of the slide arm towards the extended position the object is moved in the transfer direction along the roller conveyor. The method further includes sliding the slide arm from the extended position towards the retracted position to move the finger from the engaged position to the disengaged position such that the slide arm moves independent from the object.

By providing the slide arm slidably connected to the rail that extends parallel to the transfer direction of the transfer path, the slide arm is slidably moveable between the retracted position and the extended position. In the retracted position, the slide arm covers a greater portion of the rail than the slide arm covers in the extended position. In the extended position, the slide arm extends farther away from the loading station than the slide arm extends in the retracted position. As such, the slide arm is slidable towards the unloading station upon movement of the slide arm from the retracted position towards the extended position.

By providing the finger to be pivotally connected to the slide arm, the fingers are pivotally moveable between the engaged position and a disengaged position upon movement of the slide arm between the retracted position and the extended position. In the engaged position, the finger is configured to engaged with the objection such that movement of the slide arm from the retracted position towards the extended position, the finger abuttingly engages the object and the object is moved in the transfer direction. Specifically, the object moves along the transfer path in the transfer direction from the loading station towards the unloading station as the slide arm moves from the retracted position towards the extended position. As such, the object is moveable along the transfer path in the transfer direction to move closer towards the unloading station upon engagement with the finger in the engaged position and movement of the slide arm from the retracted position towards the extended position.

As the finger is pivotally moveable between the engaged position and the disengaged position upon movement of the slide arm between the extended position and the retracted position, the finger disengages with the object upon movement of the slide arm from the extend position towards the retracted position. Upon movement of the slide arm from the extended position towards the retracted position, the finger disengaged with the object such that the finger can bypass the object and move, with the slide arm, towards the retracted position without moving the object towards the loading station. As such, the object is moveable along the transfer path in the transfer direction only towards the unloading station. Specifically, the object moves towards the unloading station upon movement of the slide arm towards the extend position; however, the object does not move towards the loading station upon movement of the slide arm towards the retracted position due to the finger in the disengaged position.

Various embodiments of conveyor assemblies are described in detail below with reference to the appended drawings.

As used herein, the term "assembly longitudinal direction" refers to the forward-rearward direction of the conveyor assembly (i.e., in the +/− assembly X-direction as depicted). The term "assembly vertical direction" refers to the upward-downward direction of the conveyor assembly (i.e., in the +/− assembly Y-direction as depicted). The term "assembly lateral direction" refers to the cross-assembly direction of the conveyor assembly (i.e., in the +/− assembly Z-direction as depicted), and is transverse to the conveyor assembly longitudinal direction. As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a conveyor assembly centerline C. The term "inboard" as used herein refers to the relative location of a component with respect to the conveyor assembly centerline C. Because the conveyor assembly structures may be generally symmetrical about the conveyor assembly centerline C, the direction to which use of terms "inboard" or "outboard" and refer may be mirrored about the conveyor assembly centerline C when evaluating components positioned along opposite sides.

Figure 1:
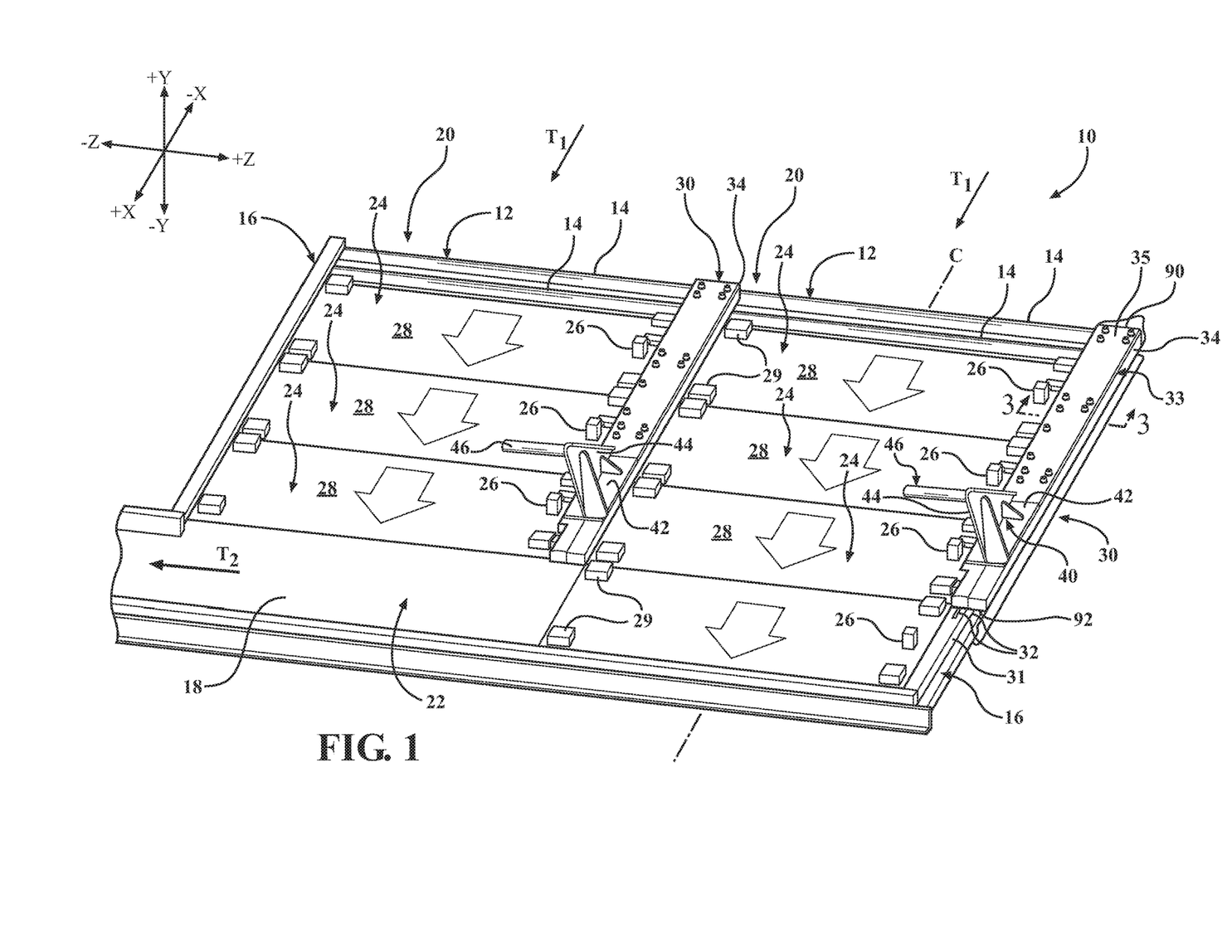
FIG. 1 schematically depicts a perspective top view of a conveyor assembly having a slide rail assembly according to one or more embodiments shown or described herein.
Figure 3:
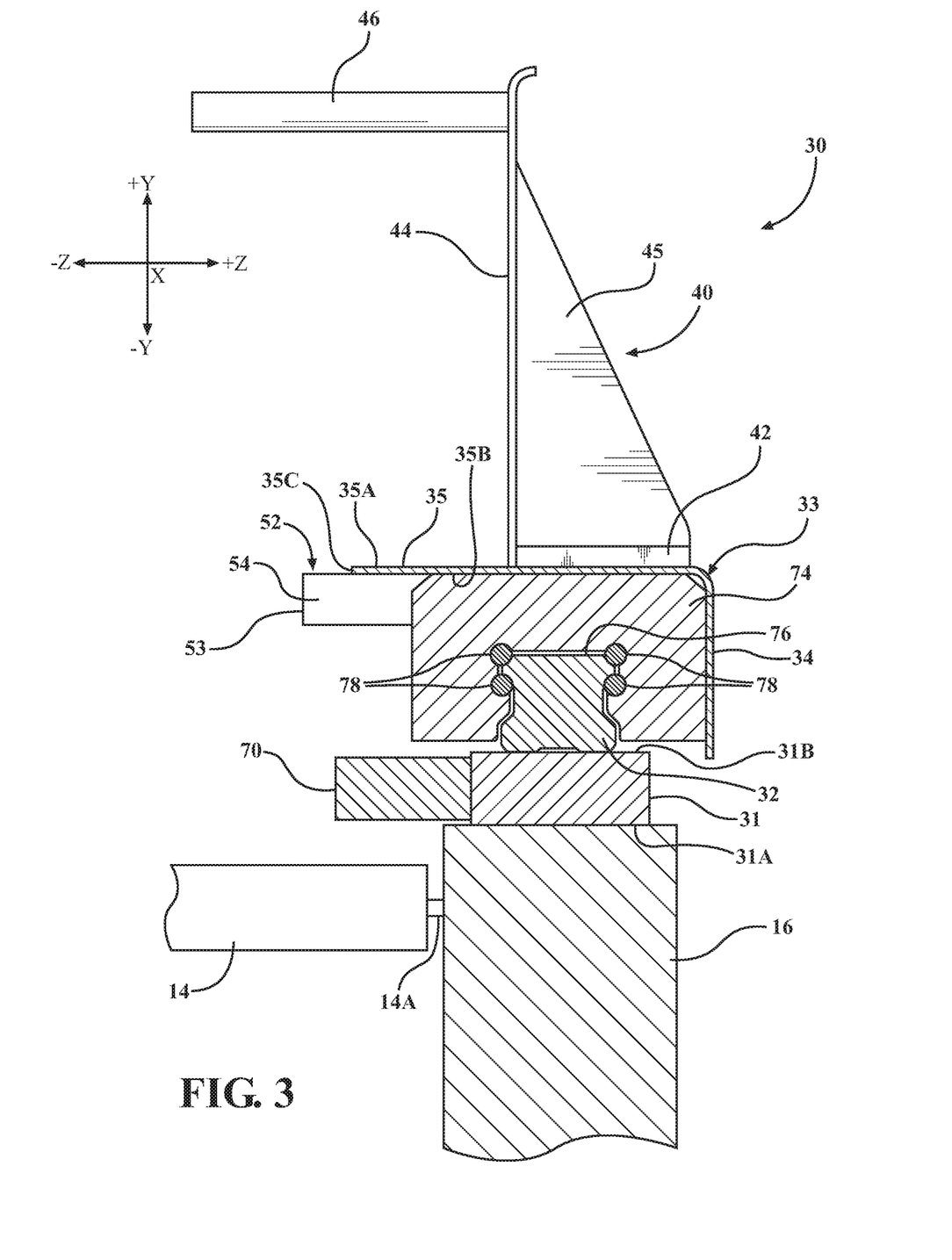
FIG. 3 schematically depicts a partial cross-sectional view of the conveyor assembly taken along the line 3-3 of FIG. 1, according to one or more embodiments shown or described herein.

Referring to FIG. 1, a conveyor assembly 10 is depicted. The conveyor assembly 10 includes a conveyor 12. The conveyor 12, such as a roller conveyor, includes a plurality of rollers 14 that are rotatably connected to a pair of side rails 16. The plurality of rollers 14 are extend in the assembly lateral direction substantially perpendicular to a transfer direction T1. The plurality of rollers 14 are rotatably connected to the pair of side rails 16 of the conveyor assembly 10 by a plurality of pins 14A, as shown in FIG. 3.

Referring to FIG. 1, the conveyor assembly 10 includes a secondary conveyor 18 that extends in a secondary transfer direction T2. The secondary conveyor 18 is provided at one end of the conveyor 12. The conveyor assembly 10 includes a loading station 20 on the other end of the conveyor 12 opposite the secondary conveyor 18. In some embodiments, the secondary conveyor 18 functions as an unloading station 22. The transfer direction T1 is the direction from the loading station 20 towards the unloading station 22 on the transfer path defined by the conveyor 12.

Objects 24, such as pallets, are loaded onto the conveyor assembly 10. Specifically, the objects 24 are loaded onto the conveyor 12 at the loading station 20. The objects 24 travel along a transfer path formed by the conveyor 12 in the transfer direction T1. The objects 24 exit the transfer path formed by the conveyor 12 at the unloading station 22 and are transferred to the secondary conveyor 18 and are transferred in the secondary transfer direction T2. In some embodiments, the junction of the conveyor 12 and the secondary conveyor 18 forms the unloading station 22. In some embodiments, the secondary transfer direction T2 of the secondary conveyor 18 extends substantially normal to the transfer direction T1 of the conveyor 12.

As will be described in greater detail below, the objects 24 include posts 26 that extend upwardly in the assembly vertical direction from a surface 28 of the objects 24, and the posts 26 are configured to engaged with a slide rail assembly 30 to transfer the objects 24 from the loading station 20 towards the unloading station 22 in the transfer direction T1. In some embodiments, a plurality of objects 24 are loaded onto the conveyor 12 at the loading station 20 and sequentially exit the conveyor 12 onto the secondary conveyor 18. In some embodiments, the objects 24 may include corner posts 29 that are positioned at the corners of the object 24. In some embodiments, the corner posts 29 may have a height that is less than a height of the posts 26.

Figure 2A:
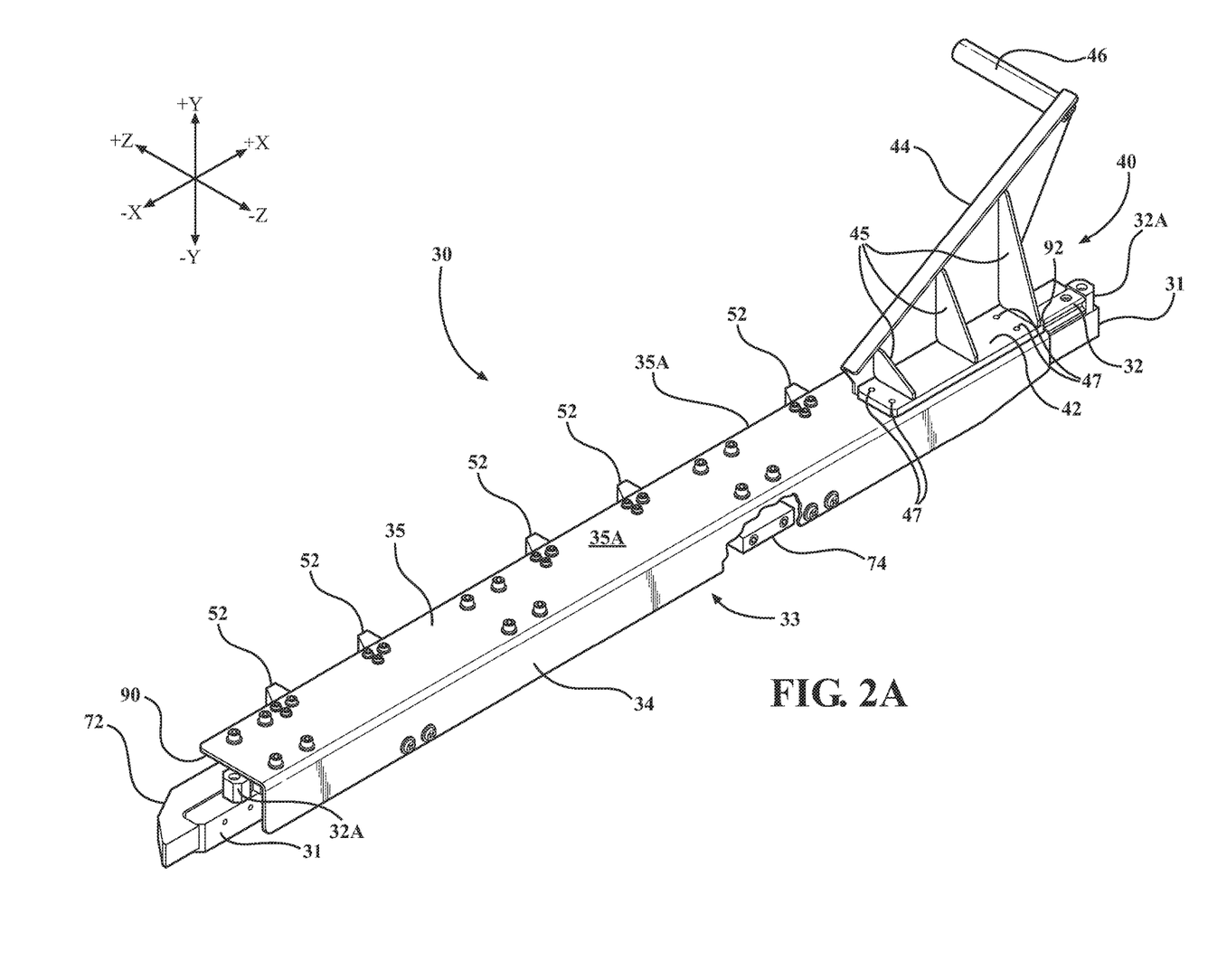
FIG. 2A schematically depicts a perspective top view partial side view of the slide rail assembly of FIG. 1, according to one or more embodiments shown or described herein.
Figure 2B:
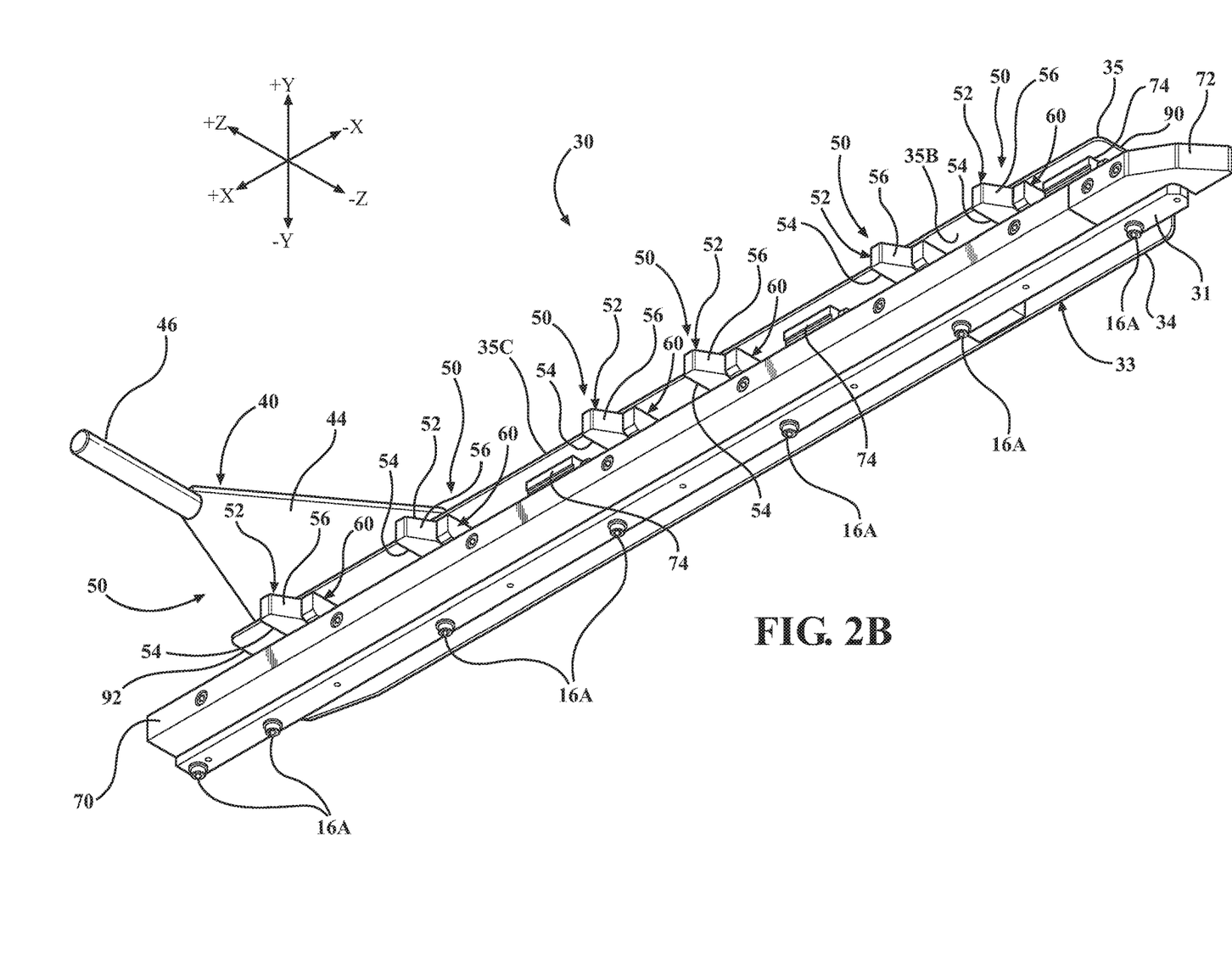
FIG. 2B schematically depicts a perspective bottom view of the slide rail assembly of FIG. 1, according to one or more embodiments shown or described herein.

Referring to FIGS. 1-3, the slide rail assembly 30 includes a base 31, a rail 32, a slide arm 33, a handle assembly 40, and a finger assembly 50. The base 31 extends generally parallel to the transfer direction T1 of the conveyor 12. The base 31 includes a bottom surface 31A, an opposite upper surface 31B, and a pair of side surfaces 31C. The base 31 is connected to the side rail 16 of the conveyor 12, such that the bottom surface 31A contacts the one of the pair of side rails 16. As shown in FIG. 2B, fasteners 16A extend through the base 31 and connect to one of the pair of side rails 16 to secure the entire slide rail assembly 30 to the conveyor 12.

The rail 32 is connected to an upper surface 31B of the base 31. In some embodiments, the rail 32 is an elongated linear rail that extends substantially parallel to the transfer direction T1 of the conveyor 12. As will be discussed in greater detail below, the rail 32 has a shaped cross-section.

The slide arm 33 includes a flange 34 and a slide arm wall 35. In some embodiments, the flange 34 and the slide arm wall 35 form a generally L-shaped cross section. In such an embodiment, the flange 34 extends substantially downwardly from the slide arm wall 35 in the assembly vertical direction. The flange 34 is provided on an outboard side of the slide arm wall 35 such that flange 34 is positioned on a side opposite of the slide arm wall 35 positioned adjacent the conveyor 12. The flange 34 is useful in inhibiting foreign objects from interfering with the slide rail assembly 30.

The slide arm wall 35 includes an upper surface 35A, an opposite lower surface 35B, and a side edge 35C. The upper surface 35A is positioned above the lower surface 35B in the conveyor vertical direction. The side edge 35C is positioned on the slide arm wall 35 opposite the flange 34.

The handle assembly 40 includes a base wall 42, a support wall 44, a plurality of ribs 45, and a handle 46. The base wall 42 is secured to the slide arm 33. Specifically, the base wall 42 contacts the upper surface 35A of the slide arm wall 35. A plurality of fasteners 47 connect the base wall 42 to the slide arm wall 35.

The support wall 44 extends in the assembly vertical direction from the base wall 42. The plurality of ribs 45 extend between the base wall 42 and the support wall 44. The plurality of ribs 45 reinforce the support wall 44. The handle 46 extends from the support wall 44 in the assembly lateral direction. In some embodiments, the handle 46 extends inwardly with respect to the conveyor centerline C. In some embodiments, the handle 46 may extend outwardly with respect to the conveyor centerline C. In some other embodiments, the handle 46 extends in other directions, illustratively including the assembly longitudinal direction and/or the assembly vertical direction. As will be described in greater detail below, the handle 46 is configured to be grasped by a user to operate the slide rail assembly 30.

Referring to FIGS. 2A-2B and 3, a plurality of linear bearings 74 are connected to the slide arm 33. Specifically, the linear bearings 74 are connected to the lower surface 35B of the slide arm wall 35. The linear bearings 74 include a cavity 76 having a shaped cross-section that corresponds to the shaped cross-section of the rail 32. A plurality of bearings 78 are provided in linear bearings 74 to extends at least partially into the cavity 76. The linear bearings 74 engage with the rail 32 to slidably connect the slide arm 33 to the rail 32 such that the slide arm 33 is slidably moveable along the rail 32 parallel to the transfer direction T1. The engagement of the rail 32 within the cavity 76 of the linear bearings 74 prevents the slide arm wall 35 from disengaging from the rail 32 due to the shaped cross-section of the rail 32 and the corresponding shaped cross-section of the cavity 76 of the linear bearings 74. The bearings 78 decrease a friction between the rail 32 and the linear bearings 74 such that the slide arm 33 is easily slidably along the rail 32.

Figure 5A:
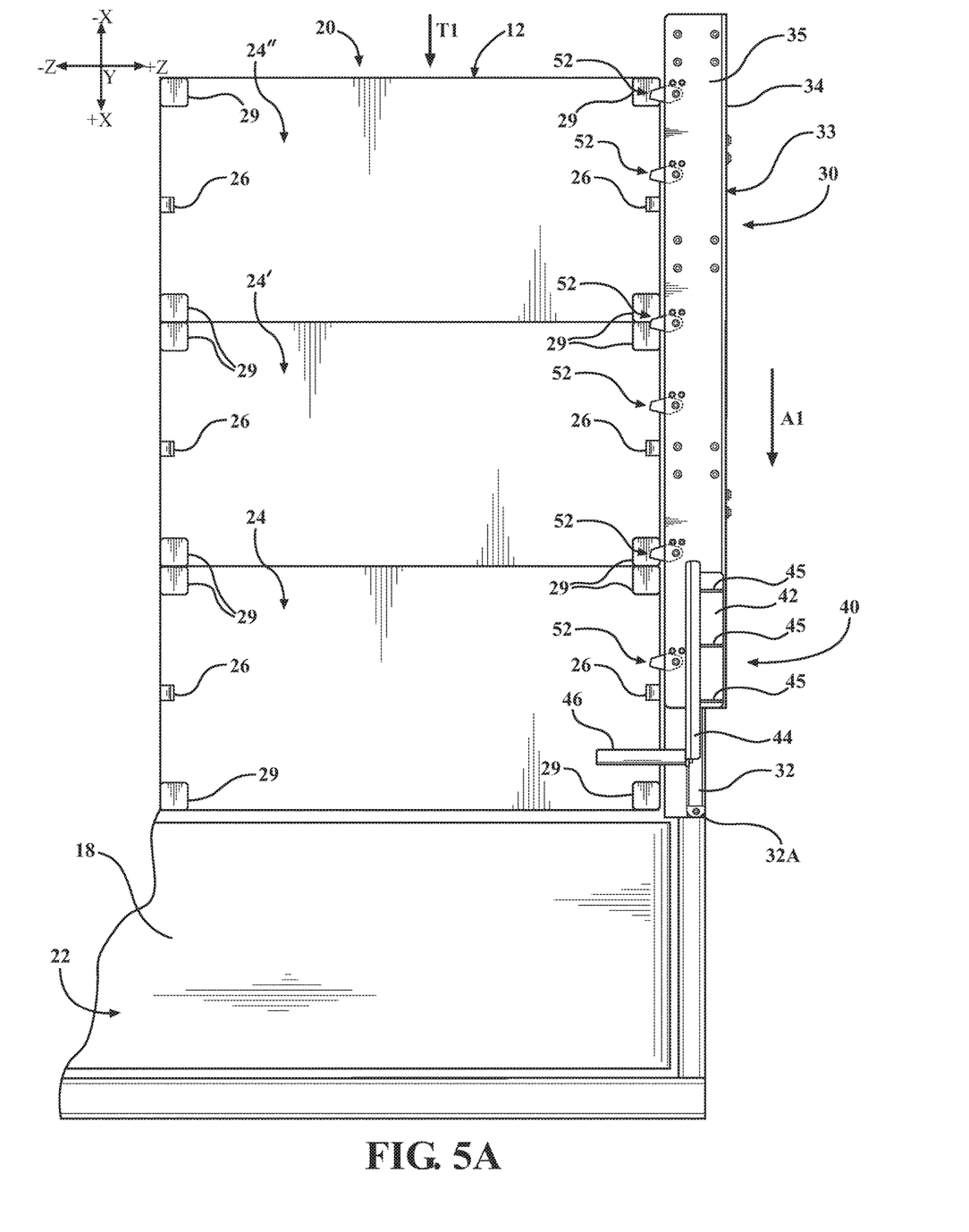
FIG. 5A schematically depicts a partial top view of the conveyor assembly of FIG. 1, in which the slide arm is in a retracted position, according to one or more embodiments shown or described herein.
Figure 5B:
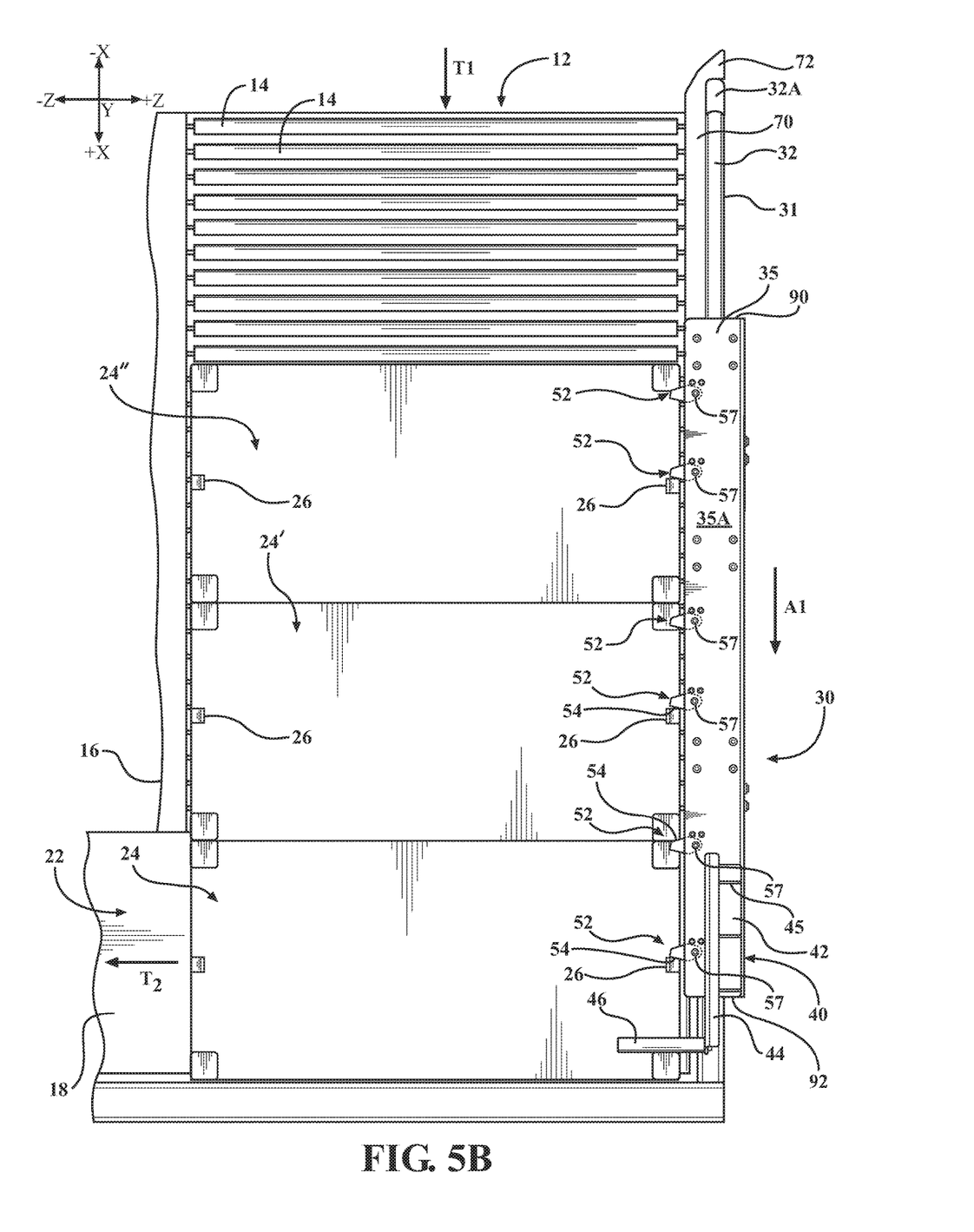
FIG. 5B schematically depicts a partial top view of the conveyor assembly of FIG. 1, in which the slide arm is in an extended position, according to one or more embodiments shown or described herein.

As discussed in greater detail below, the slide arm 33 is slidably between a retracted position, as shown in FIG. 5A, and an extended position, as shown in FIG. 5B. In the retracted position, the slide arm 33 covers a greater portion of the rail 32 than a portion of the rail 32 that the slide arm 3 covers in the extended position. In the extended position, the slide arm 33 extends farther away from the loading station 20 than the slide arm 33 extends from the loading station 20 in the retracted position. As such, the slide arm 33 is slidable towards the unloading station 22 upon movement of the slide arm 33 from the retracted position towards the extended position.

As best shown in FIG. 2A, the rail 32 includes a pair of rail bumpers 32A provided at each end of the rail 32. The rail bumpers 32A prevent the slide arm 33 from disengaging with the rail 32. Specifically, the linear bearings 74 contact the rail bumpers 32A to limit an overall displacement of the slide arm 33 with respect to the rail 32.

The slide rail assembly 30 may also include a linear bumper 70. The linear bumper 70 is connected to one of the pair of side surfaces 31C of the base 31. Specifically, the linear bumper 70 is connected to the inboard side surface 31C of the base 31. The linear bumper 70 extends inwardly, towards the conveyor centerline C, beyond the side edge 35C of the slide arm wall 35. The linear bumper 70 prevents the objects 24 from contacting the slide arm wall 35 during operation of the slide rail assembly 30.

The slide rail assembly 30 may also include an end bumper 72. The end bumper 72 is positioned on an end of the linear bumper 70 adjacent the loading station 20. The end bumper 72 may be provided with a tapered shape that facilitates the loading of the objects 24 onto the conveyor 12 without contacting the slide arm 33.

Figure 4:
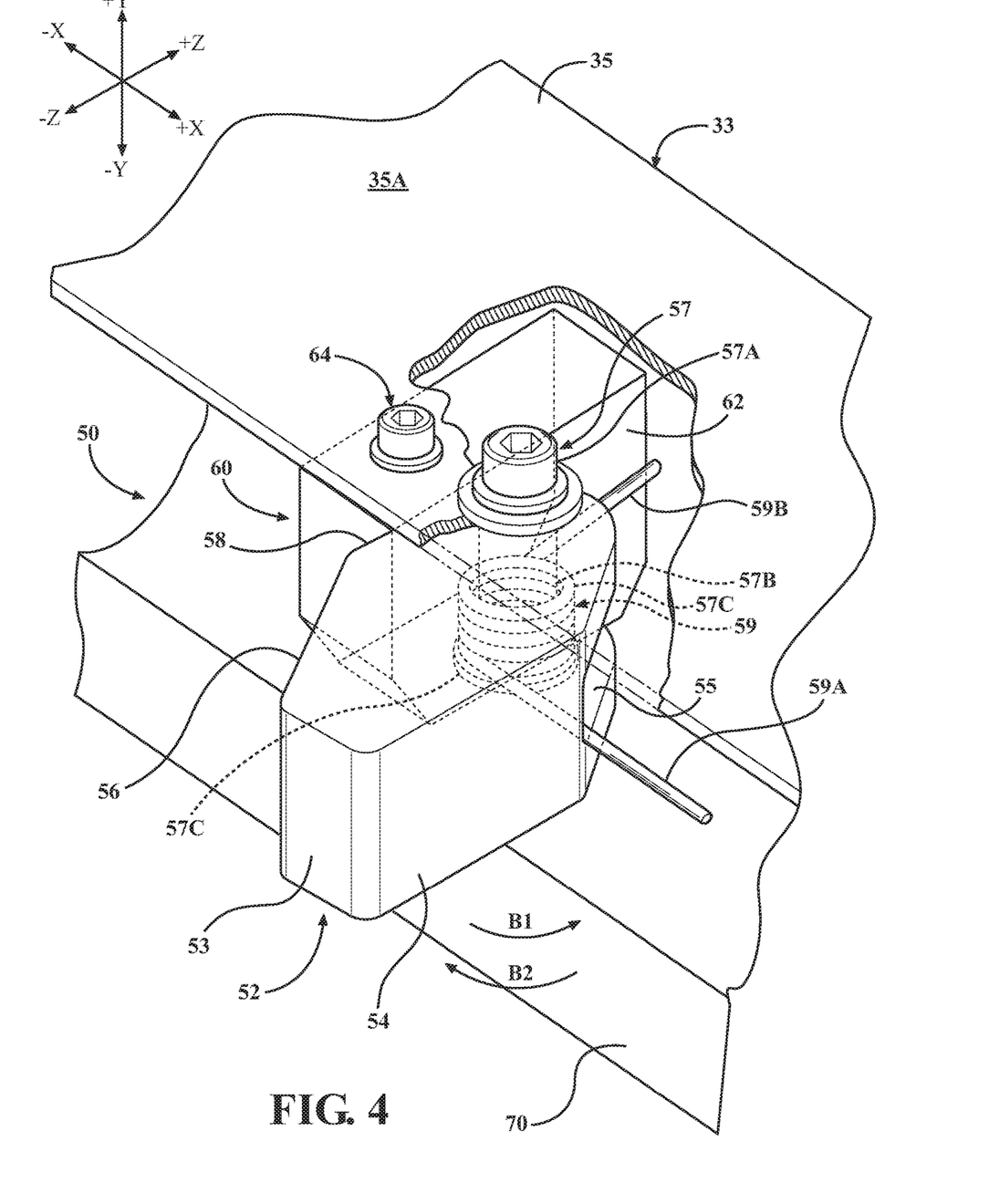
FIG. 4 schematically depicts a partial perspective view of the slide rail assembly of FIG. 1, in which a portion of a slide arm has been removed, according to one or more embodiments shown or described herein.

Referring to FIG. 4, the finger assemblies 50 include a finger 52, a pin 57, a biasing member 59, and a stopper 60. The finger 52 includes a contact surface 54, a tapered surface 56, and an abutment surface 58. The contact surface 54 is positioned on a side opposite the tapered surface 56 and the abutment surface 58. The finger 52 may also include a recess 55. In some embodiments, the finger 52 may also include an end surface 53 that extends between the contact surface 54 and the tapered surface 56.

The pin 57 includes a head 57A, a shaft 57B, and a connector 57C. The head 57A is provided on one end of the shaft 57B and the connector 57C is provided on the opposite end of the shaft 57B. The pin 57 extends through an aperture formed in the slide arm wall 35. The finger 52 is pivotally connected to the pin 57 such that the finger 52 can pivot in a first direction B1 and an opposite direction B2 about the shaft 57B. The connector 57C secures the finger 52 to the shaft 57B to retain the finger 52 to the pin 57 and the slide arm wall 35.

The stopper 60 is positioned adjacent the finger 52. Specifically, the stopper 60 is connected to the slide arm wall 35 by a fastener 64. The stopper 60 is positioned on a loading station side of the finger 52, specifically, the abutment surface 58 of the finger 52 faces the stopper 60 when the finger 52 is in the engaged position. The stopper 60 includes a finger contact surface 62 that faces the abutment surface 58 of the finger 52.

The biasing member 59 is positioned on shaft 57B of the pin 57. As will be described in greater detail below, the biasing member 59 biases the finger 52 in the second direction B2 towards an engaged position as shown in FIG. 4. In the engaged position, the abutment surface 58 of the finger 52 contacts and abuts the finger contact surface 62 of the stopper 60. As the abutment surface 58 of the finger 52 contacts and abuts the finger contact surface 62 of the stopper 60, the finger 52 is prevent from further pivoting in the second direction B2.

In some embodiments, the biasing member 59 is a torsion spring having a finger end 59A, a stopper end 59B, and a coil portion 59C. The finger end 59A contacts the finger 52. In some embodiments, the finger end 59A of the biasing member 59 extends at least partially within the recess 55 of the finger 52. The stopper end 59B contacts the finger contact surface 62 of the stopper 60. At least a portion of the shaft 57B extends through the coil portion 59C.

Figure 5C:
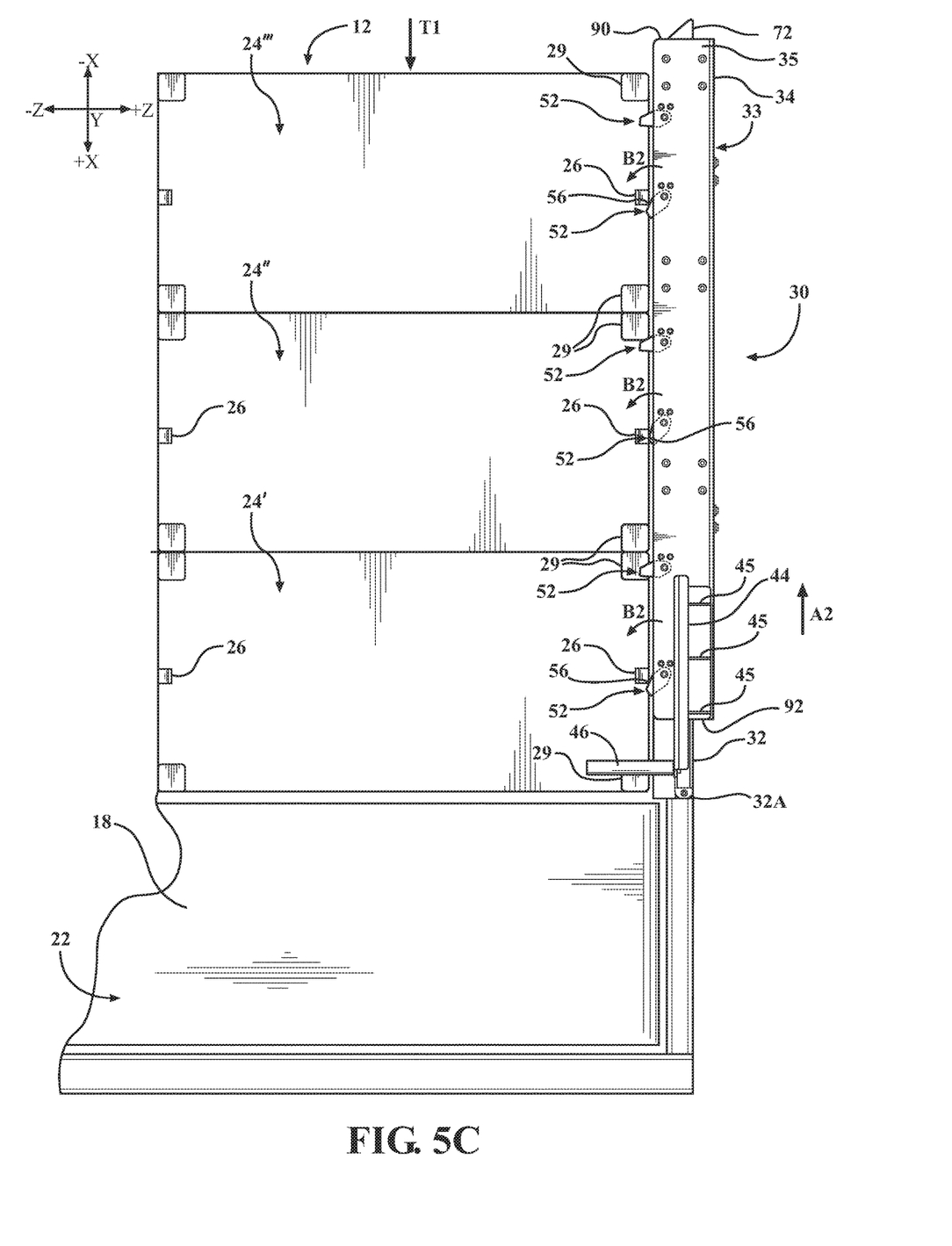
FIG. 5C schematically depicts a partial top view of the conveyor assembly of FIG. 1, in which the slide arm is moved from the extended position to the retracted position, according to one or more embodiments shown or described herein.

As the finger 52 is pivotally connected to the slide arm wall 35 about the pin 57, the finger 52 is pivotally moveable between the engaged position, as shown in FIG. 4, and a disengaged position, as shown in FIG. 5C. In the disengaged position, the finger 52 is pivoted in the first direction B1 such that a portion of the finger 52 is positioned beneath the slide arm wall 35. Specifically, in the disengaged position the finger 52 pivots about the pin 57 in the first direction B1 such that the end surface 53 is positioned closer to the side edge 35C than the end surface 53 in the engaged position.

As shown in FIG. 3, the finger 52 is in the engaged position in which the end surface 53 extends inwardly, in the assembly lateral direction, beyond the side edge 35C of the slide arm wall 35. Further, the end surface 53 of the finger 52 extends inwardly, in the assembly lateral direction, beyond the linear bumper 70. The finger 52 is positioned a predetermined height above the conveyor 12 such that the finger 52 engaged with the post 26 and extending above corner posts 29.

Referring to FIGS. 5A-5C, the operation of the slide rail assembly 30 of the conveyor assembly 10 will be discussed. Referring to FIG. 5A, the slide arm 33 is in the retracted position. In the retracted position, a loading station end 90 of the slide arm 33 is positioned adjacent the loading station 20 and an unloading station end 92 of the slide arm 33 is positioned spaced apart from the unloading station 22. In the retracted position, the fingers 52 are positioned in the engaged position.

During operation, at least one object 24 is loaded onto the plurality of rollers 14 of the conveyor 12 at the loading station 20. In order to move the object 24 towards the unloading station 22 in the transfer path T1, a user grasps the handle 46 and pulls the handle 46 in a first linear direction A1. As the handle 46 is connected to the slide arm 33, pulling the handle 46 in the first linear direction A1 pulls the slide arm 33 in the first linear direction A1. Specifically, the linear bearings 74 that are connected to the slide arm 33 allow the slide arm 33 to slide in the first linear direction A1 which is substantially parallel to the transfer direction T1. As the fingers 52 are in the engaged position, continued movement of the slide arm 33 in the first linear direction A1 brings the contact surface 54 of the finger 52 into contact with the posts 26 of the objects 24 such that the finger 52 engages with the object 24. Specifically, in the engaged position the contact surface 54 of the finger 52 abuts with the post 26. As the abutment surface 58 of the finger 52 abuts against the finger contact surface 62 of the stopper 60, the finger 52 is prevented from further rotation in the first direction B1.

Upon movement of the slide arm 33 from the retracted position towards the extended position, the slide arm 33 slides along the rail 32 in the first linear direction A1 and the object 24 is moved in the transfer direction T1 along the conveyor 12 from the loading station 20 towards the unloading station 22 due to the contact between the contact surface 54 of the finger 52 and the post 26 of the object 24.

Referring to FIG. 5B, the user operates the handle 46 to pull the slide arm 33 into the extended position. In the extended position, the loading station end 90 of the slide arm 33 is spaced apart from the loading station 20 and the unloading station end 92 of the slide arm 33 is positioned adjacent the unloading station 22. The movement of the slide arm 33 from the retracted position to the extended position moves the object 24, in the transfer direction T1, from the conveyor 12 to the unloading station 22 at the secondary conveyor 18.

Referring to FIG. 5C, upon unloading of the object 24 onto the secondary conveyor 18 at the unloading station 22, the user operates the handle 46 to push the slide arm 33 in a second linear direction A2 from the extended position towards the retracted position. The second linear direction A2 is parallel to and opposite the first linear direction A1 and the transfer direction T1. The movement of the slide arm 33 from the extended position towards the retracted position will bring the tapered surface 56 of the finger 52 into contact with the post 26 of the object 24. Upon contact of the tapered surface 56 of the finger 52 with the post 26, the finger 52 pivots in the first direction B1. The movement of the slide arm 33 from the extended position towards the retracted position causes the finger 52 to pivot in the first direction B1 from the engaged position to the disengaged position. As the finger 52 is pivotally connected to the pin 57, the contact of the tapered surface 56 against the post 26 of the object 24 overcomes the biasing force of the biasing member 59 to pivot the finger 52 from the engaged position to the disengaged position. In the disengaged position, the finger 52 is disengaged with the object 24 such that the finger 52 folds underneath the slide arm 33 to bypass the object 24, specifically, the post 26 of the object 24.

In the disengaged position, the finger 52 is disengaged with the object 24 such that continued movement of the slide arm 33 from the extended position towards the retracted position does not move the object 24 in the second linear direction A2. Rather, the finger 52 folds underneath slide arm 33 such that finger 52 does not engaged the object 24 to move the object 24, with the movement of the slide arm 33, towards the loading station 20. As such, the slide rail assembly 30 is configured to move the object 24 only in the transfer direction T1 upon movement of the slide arm 33 from the retracted position towards the extended position without moving the object 24 in the second linear direction A2 upon movement of the slide arm 33 from the extended position towards the retracted position.

In some embodiments, the conveyor assembly 10 is provided with a slide rail assembly 30 having a plurality of finger assemblies 50. The plurality of finger assemblies 50 are spaced apart along the slide arm 33 such that the fingers 52 of the plurality of finger assemblies 50 engage with a plurality of objects 24, 24', and 24". As shown in FIGS. 5A and 5B, the objects 24, 24', and 24" are each moved in the transfer direction T1 upon movement of the slide arm 33 from the retracted position towards the extended position. As such, the slide rail assembly 30 is configured to move the object 24 in the transfer direction T1 from the conveyor 12 to the unloading station 22 at the secondary conveyor 18 while simultaneously indexing the objects 24' and 24" downstream on the conveyor 12 to allow for the loading of another object 24''' onto the conveyor 12 at the loading station 20. Subsequent movement of the slide arm 33 from the extended position to the retracted position and back to the extended position, the object 24' is moved in the transfer direction T1 from the conveyor 12 to the unloading station 22 at the secondary conveyor 18.

In some embodiments, only a portion of the plurality of fingers 52 engaged with the post 26 of the object 24 to move the object 24 in the transfer direction T1. The plurality of fingers 52 are spaced such that the slide rail assembly 30 can be used to index objects 24 having various dimensions without the need for disassembly, reconfiguration, and reassembly of the slide rail assembly 30. Rather, the plurality of fingers 52 may be spaced such that only a portion of the plurality of fingers 52 engages with objects 24 of a first dimension in the engaged position, and the remaining fingers 52 engages with objects of a second dimension in the engaged position. As such, a user need only load the objects unto the loading station 20 without need for reconfiguration of the slide rail assembly 30 to accommodate objects having different dimensions.

It is appreciated, that the plurality of finger assemblies 50 are spaced apart such that the operation of the handle 46 by the user moves the object 24 on the conveyor 12 adjacent the secondary conveyor 18 onto the secondary conveyor 18 while indexing the object 24' into position to be moved onto the secondary conveyor 18 upon subsequent operation of the slide arm 33 from the extended position to the retracted position and back to the extended position.

In some embodiments, the fingers 52 engage the posts 26 that extended upwardly from the surface 28 of the objects 24. In some other embodiments, the fingers 52 engage the objects 24 directly. It is appreciated, that the objects 24 such as pallets are configured to support at least one component, such as vehicle component.

As shown in FIG. 1, the slide rail assembly 30 is positioned on one of the pair of side rails 16 of the conveyor 12. In some embodiments, the conveyor 12 includes a pair of conveyors 12 each provided with a separate slide rail assembly 30. In FIG. 1, a slide rail assembly 30 is provided for each of the two conveyors 12, and the slide rail assemblies 30 operated independently.

Figure 6:
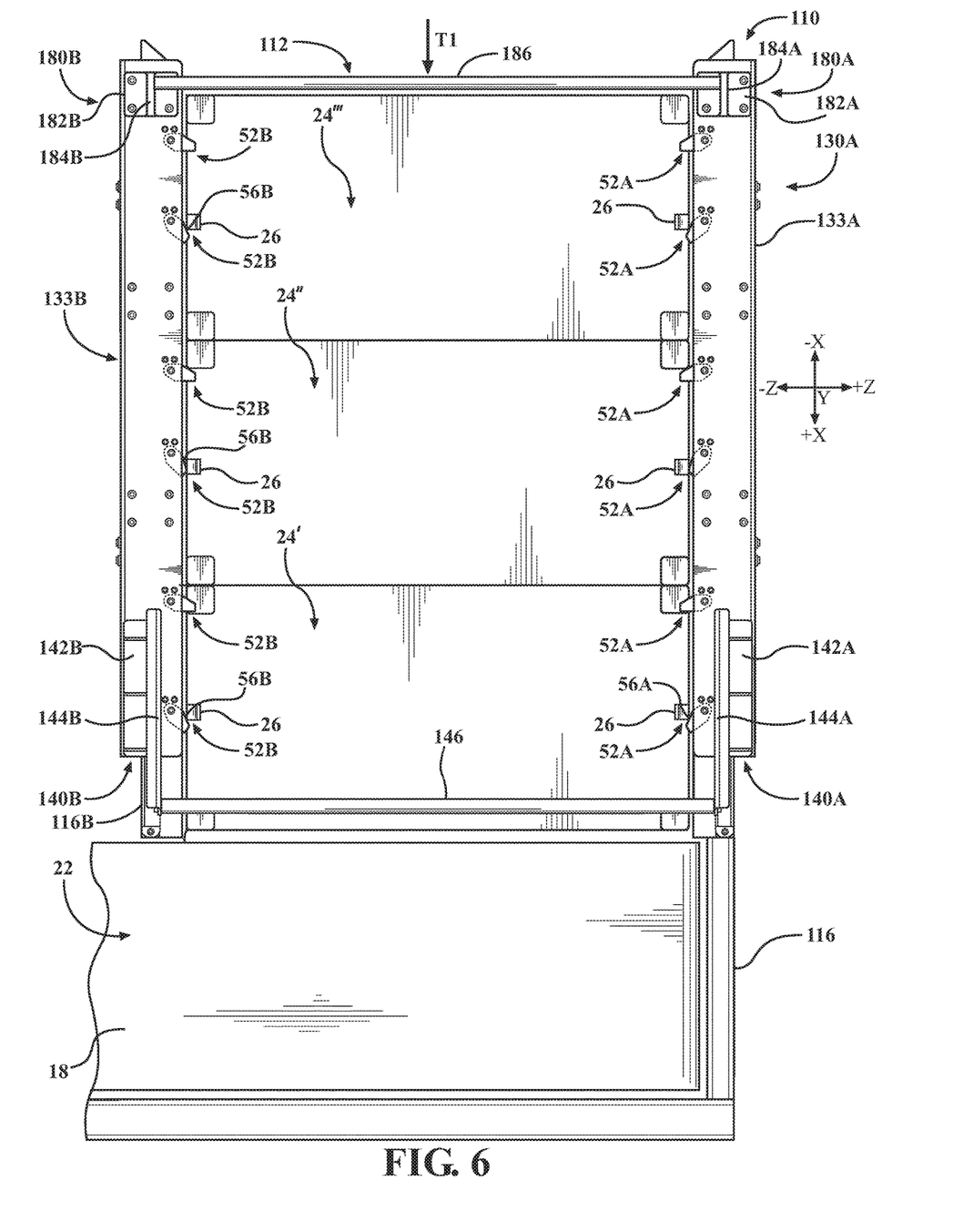
FIG. 6 schematically depicts a partial top view of the conveyor assembly, according to one or more embodiments shown or described herein.

Referring to FIG. 6, conveyor assembly is generally illustrated at 110. The conveyor assembly 110 is similar to the conveyor assembly 10 except that the roller conveyor assembly 110 includes a pair of slide rail assemblies 130A, 130B. The slide rail assemblies 130A, 130B are similar to the slide rail assembly 30 except that the slide rail assembly 130A is connected to the side rail 116A and the slide rail assembly 130 is connected to the side rail 116B. The slide rail assemblies 130A, 130B include slide arms 133A, 133B and handle assemblies 140A, 140B. The handle assemblies 140A, 140B are similar to the handle assembly 40 except that the handle 146 extends between the support walls 144A, 144B. As such, the handle 146 is connected to the support walls 144A, 144B that are connected to the slide arms 133A, 133B by the base walls 142A, 142B. Therefore, the user can pull or push the handle 146 to operate both the slide rail assemblies 130A, 130B. Specifically, the user can pull the handle 146 to move both the slide arms 133A, 133B from the retracted positions towards the extended positions.

The slide rail assemblies 130, 130B include finger assemblies 150A, 150B that engage with the posts 26 of the objects 24. By providing slide rail assemblies 130A, 130B on both of the pair of side rails 116A, 116B, both sides of the objects 24 are engaged with the finger assemblies 50A, 50B.

In some embodiments, the slide rail assemblies 130A, 130B may also include reinforcement assemblies 180A, 180B. Each of the reinforcement assemblies 180A, 180B include base walls 182A, 182B connected to the slide arms 133A, 133B, respectively. Support walls 184A, 184B extend upwardly from the base walls 182A, 182B, respectively. The reinforcement assemblies 180A, 180B include a reinforcement bar 186 that extends between the support walls 184A, 184B to reinforce the connection of the slide rail assemblies 130A, 130B. It is appreciated, that the reinforcement assemblies 180A, 180B are dimensioned such that the reinforcement bar 186 is positioned a predetermined height above the conveyor 112 such that the reinforcement bar 186 does not interfere with the loading of the objects 24 onto the conveyor 112 at the loading station 120, and such that the objects 24 can pass underneath the reinforcement bar 186 as the objects 24 move along the conveyor 112 in the transfer direction T1.

It is appreciated, that the conveyor assembly 10 and the conveyor assembly 110 include conveyors other than roller conveyor 12 and roller conveyor 112. In some embodiments, the conveyor 12 and the conveyor 112 are provided as planar surfaces that define the transfer path.

It is appreciated that the finger assembly 50, specifically, the fingers 52 are spaced apart a predetermined distance based on a length of the object 24 such that the movement of the slide arm 33 from the retracted position to the extended position positions the object 24 from the conveyor 12 onto the unloading station 22. In some embodiments, the finger assembly 50 adjacent the unloading station end 92 of the slide arm 33 is positioned a so as to transfer the object 24 onto the unloading station 22 while the remaining finger assemblies 50 are positioned so as to index the objects 24' into position to be transferred to the unloading station 22 upon subsequent movement of the slide arm 33 from the retracted position to the extended position.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A slide rail assembly for moving an object on a transfer path, the slide rail assembly comprising:
    a rail that extends parallel to a transfer direction of the transfer path;
    a slide arm that is slidably connected to the rail, the slide arm is moveable in the transfer direction between a retracted position and an extended position; and
    a plurality of fingers connected to the slide arm, each of the plurality of fingers are independently moveable between an engaged position and a disengaged position upon movement of the slide arm between the retracted position and the extended position, in the engaged position at least one of the plurality of fingers is engaged with the object such that upon movement of the slide arm from the retracted position towards the extended position the object is moved in the transfer direction along the transfer path,
    wherein the slide arm is positioned above the transfer path.

2. The slide rail assembly of claim 1, wherein in the disengaged position each of the plurality of fingers are disengaged with the object such that upon movement of the slide arm from the extended position towards the retracted position the slide arm moves independent from the object.

3. The slide rail assembly of claim 2 further comprising a plurality of biasing members that biases each of the plurality of fingers towards the engaged position.

4. The slide rail assembly of claim 3 further comprising a plurality of stoppers connected to the slide arm, each of the plurality of stoppers inhibits each of the plurality of fingers from pivoting beyond the engaged position.

5. The slide rail assembly of claim 4, wherein each of the plurality of fingers are pivotally connected to the slide arm such that each of the plurality of fingers pivots between the engaged position and the disengaged position.

6. The slide rail assembly of claim 5, wherein each of the plurality of fingers includes a tapered surface that facilitates the pivoting of each of the plurality of fingers from the engaged position towards the disengaged position upon movement of the slide arm from the extended position towards the retracted position.

7. The slide rail assembly of claim 2 further comprising a handle connected to the slide arm, the handle is configured to be operated by a user to move the slide arm between the retracted position and the extended position.

8. The slide rail assembly of claim 2, wherein the object is a pallet having a post, and wherein in the engaged position at least one of the plurality of fingers engages with the post such that upon movement of the slide arm from the retracted position towards the extended position the object is moved in the transfer direction along the transfer path.

9. A conveyor assembly for moving an object, the conveyor assembly comprising:
    a transfer path that extends in a transfer direction;
    a rail that extends adjacent the transfer path and parallel to the transfer direction;
    a slide arm that is slidably connected to the rail, the slide arm is moveable in the transfer direction between a retracted position and an extended position; and
    a finger connected to the slide arm, the finger is moveable between an engaged position and a disengaged position upon movement of the slide arm between the retracted position and the extended position, in the engaged position the finger is engaged with the object such that upon movement of the slide arm from the retracted position towards the extended position the object is moved in the transfer direction along the transfer path,
    wherein the object is a pallet having a post, and wherein in the engaged position the finger is engaged with the post such that upon movement of the slide arm from the retracted position towards the extended position the object is moved in the transfer direction along the transfer path.

10. The conveyor assembly of claim 9, wherein in the disengaged position the finger is disengaged with the object such that upon movement of the slide arm from the extended position towards the retracted position the slide arm moves independent from the object.

11. The conveyor assembly of claim 10 further comprising a biasing member that biases the finger towards the engaged position.

12. The conveyor assembly of claim 11 further comprising a stopper connected to the slide arm, the stopper inhibits the finger from pivoting beyond the engaged position.

13. The conveyor assembly of claim 12, wherein the finger is pivotally connected to the slide arm such that the finger pivots between the engaged position and the disengaged position.

14. The conveyor assembly of claim 13, wherein the finger includes a tapered surface that facilitates the pivoting of the finger from the engaged position towards the disengaged position upon movement of the slide arm from the extended position towards the retracted position.

15. The conveyor assembly of claim 10, wherein the finger is a plurality of fingers that are moveable between the engaged position and the disengaged position upon movement of the slide arm between the retracted position and the extended position, in the engaged position at least one of the plurality of fingers is engaged with the object such that upon movement of the slide arm from the retracted position towards the extended position the object is moved in the transfer direction along the transfer path.

16. The conveyor assembly of claim 10 further comprising a handle connected to the slide arm, the handle is configured to be operated by a user to move the slide arm between the retracted position and the extended position.

17. A method for moving an object along a transfer path, the method comprising:
providing a slide arm that is slidably connected to a rail that extends adjacent the transfer path and parallel to a transfer direction of the transfer path, the slide arm is moveable between a retracted position and an extended position, the slide arm includes a finger pivotally connected to the slide arm, the finger is moveable between an engaged position and a disengaged position; and
sliding the slide arm from the retracted position towards the extended position to move the finger into the engaged position to engage the object such that the object is moved in the transfer direction along the transfer path,
wherein the object is a pallet having a post, and wherein in the engaged position the finger is engaged with the post such that upon movement of the slide arm from the retracted position towards the extended position the object is moved in the transfer direction along the transfer path.

18. The method of claim 17 further comprising:
sliding the slide arm from the extended position towards the retracted position to move the finger from the engaged position to the disengaged position such that the slide arm moves independent from the object.

* * * * *